Feb. 21, 1933.  J. B. PICARD  1,898,981
LUBRICATING MECHANISM
Filed Sept. 30, 1931
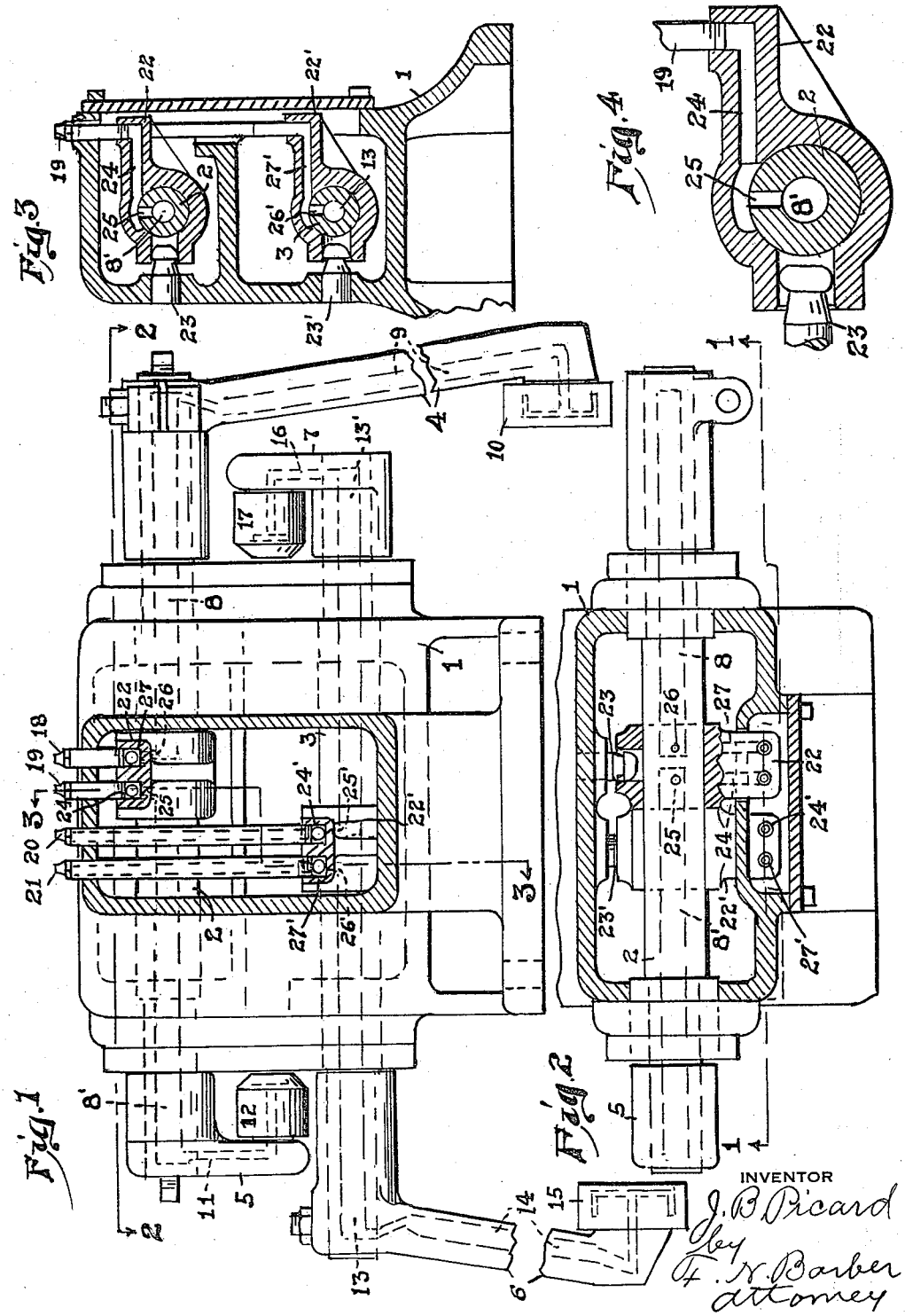
INVENTOR
J. B. Picard
by
F. N. Barber
Attorney Patented Feb. 21, 1933

1,898,981

UNITED STATES PATENT OFFICE

JOHN B. PICARD, OF TOLEDO, OHIO, ASSIGNOR TO THE NATIONAL SUPPLY COMPANY, OF TOLEDO, OHIO, A CORPORATION OF OHIO

LUBRICATING MECHANISM

Application filed September 30, 1931. Serial No. 565,992.

This invention relates to lubricating mechanisms for rocker shafts and is shown applied to a steam-operated duplex pump.

One object is to produce an entirely enclosed duct or passage system wherein the lubricant is introduced at a centralized location and conveyed to several bearings of the mechanism even while it is in motion. More specifically, one object of this invention is to produce for a rocker shaft having therein a passage through which lubricant is transmitted to a bearing, a collar surrounding the inlet duct to the passage and accompanied with means whereby, when lubricant is forced through an opening in the collar and thence into the said passage, the collar is automatically moved to increase the tightness of its fit with the shaft for an entirely closed area surrounding the said inlet, but leaving the latter open continually to the source of lubricant supply, the said increased tightness of fit preventing the escape of lubricant between the collar and the shaft. Other objects appear hereinafter.

Referring to the accompanying drawing, Fig. 1 is a side elevation of my invention with parts in section and broken away, the parts in section being along the line 1—1 on Fig. 2. Figs. 2 and 3 are respectively sections on the lines 2—2 and 3—3 on Fig. 1. Fig. 4 is an enlarged detailed section showing the interior portion of the upper portion of Fig. 3.

On the drawing, 1 designates a rocker shaft stand or frame. 2 and 3 are parallel rocker shafts, the former lying directly over the latter. They are mounted to oscillate axially in bearings in the ends of the stand.

4 is a long driving arm attached rigidly to the shaft 2, and 5 is a short arm rigidly attached to the shaft 2 and driven thereby. The arm 4 is secured to one end of the shaft 2 and the arm 5 to the other end thereof, both arms being pendent from the shaft. 6 is a long driving arm rigidly attached to the rocker shaft 3, and 7 is a short arm rigidly attached to the shaft 3 and driven thereby. The arms 6 and 7 are secured to opposite ends of the shaft 3, the arm 6 being pendent therefrom and the arm 7 standing up over the same.

It will be understood by those acquainted with the art of duplex pumps that the lower ends of the arms 4 and 6 are connected to and driven by the respective rods connecting each steam-operated piston with the pump piston which it operates, and that the arms 5 and 7 are respectively connected to the connecting rods which operate the steam-controlled valves in the steam chests of the steam-power cylinders.

The shaft 2 has the longitudinal passages 8 and 8', the former being connected at one end with the passage 9 in the arm 4, the passage 9 leading to the roller bearing 10 whose connection with one of the piston rods of the steam engine is well understood. One end of the passage 8' communicates with the passage 11 in the arm 5, the passage 11 leading to the roller bearing 12 which operates the valve in the steam chest of the steam cylinder for operating the shaft 3.

The shaft 3 has the longitudinal passages 13 and 13', one end of the passage 13 communicating with the passage 14 in the arm 6, the passage 14 leading to the roller bearing 15 which it will be understood is connected to the other piston rod of the duplex pump. The passage 13' communicates at one end with the passage 16 in the arm 7, this passage leading to the roller bearing 17 which operates the valve in the steam chest of the steam cylinder for operating the shaft 2.

18, 19, 20 and 21 are four Alemite Zerk inlet or lubricant feeding elements through which lubricant is introduced under pressure by a manually-operated lubricant gun. The lubricant feed element 19 extends down through the top of the stand 1 and is screwed into an opening in the outer end of the lever 22, the other end of the lever having slight rocking movement on the fulcrum pin 23 secured in the adjacent wall of the stand 1. The rocking movement just referred to is exceedingly slight and is permitted by any looseness in the fit of the lever on the shaft 2. When pressure is applied to the lever as described, the lever will have a closer fit with the upper surface of the shaft 2 at each side of the port 25. The shaft 2 extends entirely through the intermediate portion of the lever 22 which surrounds and fits the same. The lubricant feed element 19 communicates at is lower end with the passage 24 in the lever 22, the latter communicating with the port 25 leading to the remaining end of the passage 8′. The element 18 extends down through the stand 1 and is screwed into the outer end of the lever 22 which has the passage 27 communicating with the port 26 which opens into the remaining end of the passage 8. The passages 24 and 27 are entirely separate from each other.

The Alemite Zerk elements 20 and 21 are screwed into the lever 22′ having the passages 24′ and 27′ respectively communicating with ports 25′ and 26′ which open respectively into the passages 13′ and 13. The lever 22′ surrounds the shaft 3 and has the fulcrum 23′ secured in the side wall of the stand 1.

When a lubricant gun is applied to the element 18, the lubricant is forced through the passage 27, the port 26, and the passages 8 and 9 to the roller bearing 10. As the gun bears down upon the element 18 it rocks the lever 22 downwardly to a slight degree which causes the lever to increase the tightness of its fit for a distance entirely surrounding the port 26 in order to prevent the escape of the lubricant between the lever and the shaft 2. This ensures that the lubricant will pass to the roller bearing 10 since there would be no leakage of lubricant or loss of pressure between the lever and the shaft 2.

When the lubricant gun is applied to the element 19 the operation will be the same as that just described except that the lubricant will travel through the passage 24, the port 25, and the passages 8′ and 11 to the roller bearing 12. The pressure of the gun upon the element 19 will cause the lever 22 to rock and prevent the escape of lubricant between the shaft 2 and the lever.

When the grease gun is applied to the element 20, lubricant travels through the passage 24′, the port 25′, and the passages 13′ and 16 to the roller bearing 17, the pressure upon the element 20 causing the lever 22′ to increase the fit between the lever and the shaft 3 for an area surrounding the port 25′.

When lubricant is applied to the element 21, the lubricant travels through the passage 27′, the port 26′, and the passages 13 and 14 to the roller bearing 15, the lever 22′ being moved downwardly to increase the fit of the lever 22 for an area surrounding the port 26′.

I claim:—

1. A rocking shaft, a passage longitudinally thereof, a lateral port communicating with the passage, a lever pivoted at one end and bearing on the shaft for an area surrounding the port and having a passageway to lead lubricant to the port at all times while the shaft is rocking, and an element to feed lubricant under pressure to the passageway and movable to increase the pressure of the lever on the shaft and thereby tighten the seal of the lever for the said area.

2. A rocking shaft, two passages extending longitudinally thereof from an intermediate point, lateral ports in the shaft communcating respectively with the passages, a lever pivoted at one end and bearing on the shaft for an area surrounding the ports and having separate passageways to lead lubricant to the respective ports at all times while the shaft rocks, and means to feed lubricant under pressure to the passageway, said means being movable to urge the lever toward the shaft and thereby increase the seal between the lever and the shafts around the ports.

3. In a lubricant mechanism for a rocker shaft, a driven lever fixedly mounted on one end of the shaft for causing the shaft to rock, a bearing on the outer end of the lever, a lubricant passage extending longitudinally through the shaft and the lever to the bearing, a lateral port in the shaft communicating with the longitudinal passage, a lever having its fulcrum at one end and bearing upon the shaft for an area surrounding the port, a longitudinally movable element attached to the remaining end of the latter lever to feed lubricant under pressure to the latter lever and arranged when moved in one direction to cause the latter lever to tighten its seal with the shaft for the said area surrounding the port, and a passageway in the latter lever to convey lubricant from the said element to the port, the passageway being sufficiently long circumferentially to maintain the port in communication with the passageway at all times while the shaft rocks.

In testimony whereof, I hereunto affix my signature.

JOHN B. PICARD.